April 11, 1939.  S. T. WILLIAMS  2,154,254
VALVE STEM
Filed Dec. 29, 1933
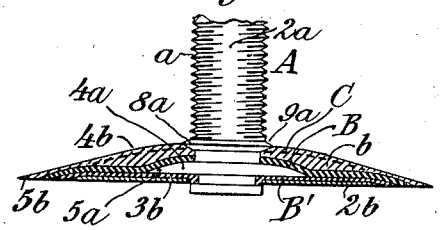
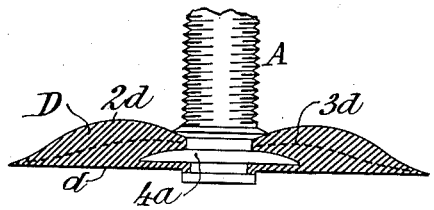
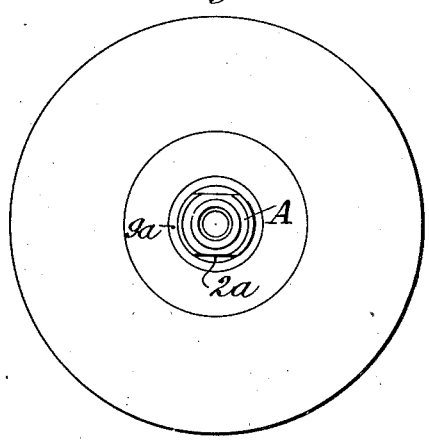
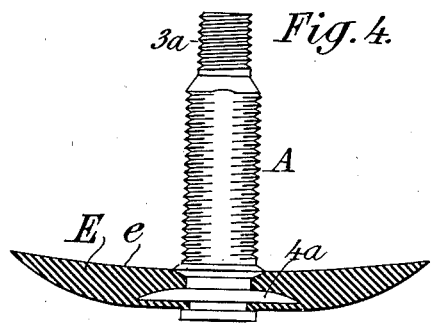
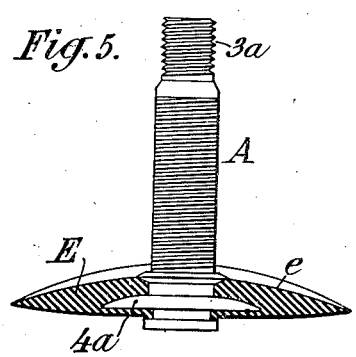
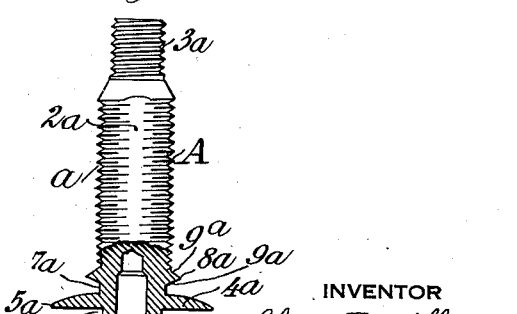
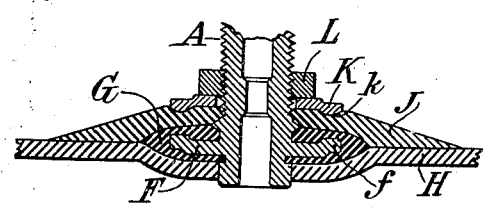
INVENTOR
Selden T. Williams,
BY
Fraser, Myers Mauley
ATTORNEYS.

Patented Apr. 11, 1939

2,154,254

UNITED STATES PATENT OFFICE 2,154,254

VALVE STEM

Selden T. Williams, Bellerose, N. Y., assignor to A. Schrader's Son, Incorporated, Brooklyn, N. Y., a corporation of New York Application December 29, 1933, Serial No. 704,420

2 Claims. (Cl. 152—429)

My present invention relates to valve stems for inflatable bodies and the like, and aims to provide certain improvements therein.

Primarily my invention is directed to valve stems for pneumatic tire tubes and aims to provide a valve stem having the following advantageous characteristics: (1) it may be applied to standard tube rim practice without the necessity of tire mold changes; (2) it may eliminate the requirement for a fabric patch or may eliminate a patch requirement altogether if such patch be incorporated with the valve stem; (3) it may be used with the conventional clamping nut and bridge or ring washer, thereby providing an additional safety factor; (4) it permits the use of dust caps or inflating caps for improvement in appearance of the valve stem and facilitates the mounting and inflation of the tire; (5) it eliminates base leaks and permits of the "drawing back" of the valve stem into a casing upon sudden deflation of the inner tube; (6) it provides a strong shanked valve with a high inflation rate; and (7) it permits curing of the tire tube with the valve insides or valve core in place within the valve stem.

According to my present invention the valve stem is formed with an enlargement or flange spaced from the tube-engaging end of the stem whereby there is provided an extension or portion adapted to extend into the inflatable body, said stem being preferably grooved or incut adjacent the opposite faces of said flange to provide a more secure and efficient anchorage or union for a valve stem patch which may take the place of the conventional inner tube patch at the valve stem opening in such tube.

The invention also embodies other features of novelty which will be understood from the detailed description which follows.

Several embodiments of my invention are shown in the accompanying drawing, wherein:

Figure 1 shows an elevation of a valve stem embodying my invention with a valve stem patch secured thereto, said patch being shown in section.

Fig. 2 is a top plan view of the valve stem and patch shown in Fig. 1.

Fig. 3 is a view similar to Fig. 1 showing a patch of different contour.

Fig. 4 shows another view similar to Fig. 1 with still another type of patch.

Fig. 5 is a view similar to Fig. 4, but taken at right angles thereto.

Fig. 6 is a top plan view of the valve stem shown in Figs. 4 and 5.

Fig. 7 is a view partly in elevation and partly in section of the valve stem construction per se.

Fig. 8 is a view similar to Fig. 1, showing a slightly modified form of valve stem.

Referring first to Figs. 1 to 7 of the drawing, let A indicate the valve stem as a whole, which is preferably formed of brass or other suitable material, said stem being provided with the conventional screw threads $a$, flats $2a$ and reduced threaded nipple $3a$. The valve stem at the tube-engaging end thereof is formed with an annular enlargement or disk-like portion $4a$ which preferably terminates at its outer periphery in a feathered edge $5a$, said portion $4a$ being axially spaced from the end of the stem to provide an axially-extending portion $6a$. Preferably the stem adjacent the opposite faces of the portion $4a$ is formed with annular grooves or undercut portions $7a$, the purpose for which will presently appear. Between the enlargement $4a$ and the stem shank proper above the groove $7a$ is a second enlargement $8a$ of smaller diameter than the portion $4a$, said enlargement $8a$ having oppositely-directed, outwardly tapered sides or faces $9a$. The valve stem A is suitably axially bored to provide a passage for air therethrough and formed with screw-threads, shoulders and the like (not shown) for accommodating the conventional valve insides or valve core.

The disk-like portion $4a$ of the valve stem is embedded in a substantially circular or oval patch-like mass of rubber which may be suitably moulded and semi-cured about said disk-like portion, but which is preferably formed by applying circular or oval strips of uncured rubber B and B' having central holes therein over the enlargement $8a$ and over the axial extension $6a$, respectively, so that the inner peripheries of said strips will seat within the recesses $7a$, as best shown in Fig. 1, and pressing said strips together beyond the feathered edge $5a$ of the enlargement. Additional strips or quantities of uncured rubber $b$ and $2b$ may then be positioned over the strips B and B' to form a patch portion having a substantially plane tube-engaging face $3b$ and a rim-engaging face $4b$, which faces preferably meet in a tapered peripheral edge $5b$. Preferably the face $4b$ at its inner periphery will lie flush with the upper face $9a$ of the secondary enlargement $8a$ and the lower face $3b$ will leave the lower end of the axial extension $6a$ uncoated with rubber, whereby said extension may serve as a guide or centering means for properly positioning the valve stem and patch upon an inner tube in the assembling of said parts preparatory to vulcanizing them together. The rubber patch composed of the parts B, B', b and 2b, is preferably semi-cured in situ upon the valve stem in a mould (not shown), wherein the distance between the closure or bearing points of the mould faces with the outer face 9a on the enlargement 8a and with the bottom face of the projection 6a can be maintained and thereby insure against any undesired creeping or oozing of the rubber over said faces on said projections 6a and 8a. If desired, the patch may be reinforced by one or more fabric strips C. Preferably the strips or laminations B and B' which directly engage the surfaces of the enlargement 4a and the bottoms of the grooves 7a are of a rubber composition which will provide a strong adhesion or union with said metal parts, whereas the laminations or rubber stock b and 2b may be of a composition similar to that from which inner tubes are made.

In Fig. 3 I have shown a form of valve stem patch D which is thickest intermediate its inner and outer annular walls or edges and preferably formed with a suitable substantially plane inner tube engaging face d and an outwardly curved or arched rim-engaging face 2d. The patch D is so designed to provide more rubber over the metal enlargement 4a and also to assist in withdrawing the valve into the tire casing through the valve stem opening in a wheel rim when the tire is suddenly deflated. This withdrawing action is promoted by the inherent expansibility of said thickened portion which is normally subjected to compression when the inner tube mounted upon a rim is inflated, and which, when the internal pressure within the tube is relieved, seeks to assume its normal characteristics, and in doing so it will tend to move the tube and the stem carried thereby radially inwardly of the rim. If desired, this form of patch may likewise be provided with a fabric reinforcing strip 3d.

In the form of the invention shown in Figs. 4 and 5 the patch E is preferably moulded and semi-cured to provide it with a contour such that its upper face e will conform with both the circumferential and radial curvature of the inner tube to which it is applied, so that the outer curvature of such inner tube will not be distorted or provide an inwardly-directed protrusion or lump at the valve-supporting portion thereof. This can be readily accomplished since it will be appreciated that the uncured inner tube to which such patch is to be attached can be more readily deformed and cured into the desired form than the semi-cured patch E when said patch and tube are positioned within the vulcanizing mould.

In the form of my invention shown in Fig. 8, the enlargement F which is located in axially spaced relation to the tube-engaging end of the valve stem, instead of being formed with a feathered edge, is formed with parallel faces, and at its outer periphery is formed with a displaced or struck-up bead or rib f. This enlargement, as in the previous constructions described, is suitably embedded within a patch G of semi-cured rubber, through the medium of which the valve stem may be suitably united to an inner tube H by vulcanization during the vulcanizing of said tube in a mould and during the course of which action a reinforcing patch J may be positioned over the top face of the patch G and into overlying relation with the tube H. The rib f on the enlargement F may thus serve to cooperate with a conventional clamping washer K formed with a complementally-disposed bead or rib k which may be clamped into engagement over the patch G and reinforcing patch element J through the medium of a clamping nut L.

In providing a valve stem and patch assembly such as disclosed, it will be appreciated that I have provided a construction which possesses the various advantageous characteristics set forth in the opening statement of this specification and one which greatly facilitates the assembly of the valve stem to an inner tube.

From the foregoing detailed description it will be apparent to those skilled in the art that instead of providing the patch from two types of rubber stock, as disclosed in Fig. 1, prior to semi-curing the patch in situ on the valve stem, the stem may be suitably treated to improve the adhesion of the metal of the stem and the rubber of the patch, or a suitable rubber cement may be employed so that the rubber patch consisting of single rubber composition, can be applied to said stem in a single operation. It will also be apparent that the size, shape and the degree to which the patch surrounds the valve stem may be varied to suit any particular type of tire valve stem, and also that the amount of fabric or other reinforcement in the patch may be modified at will. Accordingly, I do not wish to be limited to the details of construction disclosed, since it is apparent that the same may be modified without departing from the spirit of my invention.

What I claim is:

1. A valve stem for pneumatic tubes or the like, comprising a shank having an integral disk-like enlargement in axially spaced proximity to the tube-engaging end of the shank, an axial extension beyond said enlargement having an annular grooved recess therein adjacent said disk-like enlargement, an integral annular enlargement of smaller diameter than the disk-like enlargement in axially spaced proximity thereto inwardly from said end of the shank, providing with the disk-like enlargement an annular recess in the shank, and a patch of rubber embedding said disk-like enlargement and engaging in said annular recesses but not entirely embedding either the axial extension or the second enlargement, said patch of rubber being adhesively secured to said shank at its places of engagement therewith.

2. A valve stem for pneumatic tubes, comprising a shank having an annular enlargement in axially spaced proximity to the pneumatic tube engaging end thereof, and a patch of rubber embedding said enlargement, said patch intermediate its inner annular wall and periphery being of substantially greater thickness than at said annular locations.

SELDEN T. WILLIAMS.